US010106468B2

(12) United States Patent
Yoichiro et al.

(10) Patent No.: US 10,106,468 B2
(45) Date of Patent: Oct. 23, 2018

(54) SOILLESS MEDIA COMPOSITION

(71) Applicant: TOWADA GREEN TUFF AGRO-SCIENCE CO., LTD., Tokyo (JP)

(72) Inventors: Hirose Yoichiro, Yotsukaido (JP); James Frederic Walter, Furlong, PA (US)

(73) Assignee: TOWADA GREEN TUFF AGRO-SCIENCE CO., LTD, Tokyo (JP)

( * ) Notice: Subject to any disclaimer, the term of this patent is extended or adjusted under 35 U.S.C. 154(b) by 0 days.

(21) Appl. No.: 14/927,279

(22) Filed: Oct. 29, 2015

(65) Prior Publication Data

US 2016/0122253 A1    May 5, 2016

Related U.S. Application Data

(60) Provisional application No. 62/122,873, filed on Nov. 1, 2014.

(51) Int. Cl.
| | |
|---|---|
| *C05B 17/00* | (2006.01) |
| *C05G 3/04* | (2006.01) |
| *C05D 9/00* | (2006.01) |
| *C05F 9/04* | (2006.01) |
| *A01G 24/00* | (2018.01) |

(52) U.S. Cl.
CPC .............. *C05B 17/00* (2013.01); *A01G 24/00* (2018.02); *C05D 9/00* (2013.01); *C05F 9/04* (2013.01); *C05G 3/04* (2013.01); *Y02A 40/216* (2018.01); *Y02P 20/145* (2015.11); *Y02P 60/216* (2015.11)

(58) Field of Classification Search
CPC ........ C05B 17/00; A01G 31/001; C05D 9/00; C05F 9/00; C05G 3/04; Y02P 20/145; Y02P 60/216
See application file for complete search history.

(56) References Cited

U.S. PATENT DOCUMENTS

| | | | | |
|---|---|---|---|---|
| 4,067,716 A | * | 1/1978 | Sterrett | C05F 11/00 47/9 |
| 5,106,405 A | * | 4/1992 | Goto | A01G 9/1086 71/13 |
| 6,074,988 A | | 6/2000 | King et al. | |
| 2008/0141746 A1 | * | 6/2008 | Larsen | A01G 9/1086 71/24 |
| 2009/0113791 A1 | * | 5/2009 | Bertin | A01G 9/1086 47/9 |

FOREIGN PATENT DOCUMENTS

| | | | | |
|---|---|---|---|---|
| CA | 2734241 A1 | * | 9/2012 | C05D 9/00 |
| JP | 2012244934 A | * | 12/2012 | |

OTHER PUBLICATIONS

Japan: the Official Guide. "Utsunomiya Area" pp. 1-2, retrieved Jan. 18, 2017 <https://www.jnto.go.jp/eng/regional/tochigi/utsunomiya_city.html>.*
Ferro "Size Matter: A Testing Lab Provides Insight on Growing Media" Living Architecture Monitor. vol. 14; Issue 2; Spring 2012.*
Japan: the Official Guide. "Utsunomiya Area" pp. 1-5, retrieved Sep. 13, 2017 <https://www.jnto.go.jp/eng/regional/tochigi/utsunomiya_city.html>.*
UGA Extension. "Essential pH Management in Greenhouse Crops: pH and Plant Nutrition" Bulletin 1256. pp. 1-20, retrieved Sep. 13, 2017 <http://extension.uga.edu/publications/detail.html?number=B1256> Published on Feb. 27, 2009.*
Oguchi, Chiaki T., and Hayato Yuasa. "Simultaneous wetting/drying, freeze/thaw and salt crystallization experiments of three types of Oya tuff." Geological Society, London, Special Publications 333.1 (2010): 59-72.*
Tazaki, Green tuff landslide areas are beneficial for rice nutrition in Japan, Department of Earth Sciences, Kanazawa University, Ishikawa, Japan 920-1192, 2006.

* cited by examiner

*Primary Examiner* — Jennifer A Smith
(74) *Attorney, Agent, or Firm* — Porzio Bromberg & Newman P.C.

(57) ABSTRACT

An improved soilless media composition including (a) green tuff; and (b) a substrate such as peat or bark. A method of enhancing the growth of plants including adding plant propagative material to a soilless media composition comprising (a) green tuff; and (b) a substrate.

12 Claims, No Drawings

SOILLESS MEDIA COMPOSITION

FIELD OF THE INVENTION

In one aspect, the present invention is directed to an improved soilless media composition comprising (a) green tuff; and (b) a substrate such as peat moss, coir and the like. In another aspect, the present invention is directed to a method of enhancing the growth of plants comprising adding plant propagative material to a soilless media composition comprising (a) green tuff; and (b) a substrate.

BACKGROUND OF THE INVENTION

While soil has been employed as the traditional media to grow plants in, its use has several drawbacks. Disease spores, bacteria, plant eating insects, weed seeds, pesticide and other chemical residues and assorted other unwanted materials can be contained in soil and reduce plant growth and/or contaminate the plants. Soil can also have poor hydrolytic properties and suffer from poor water holding capacity and poor drainage.

Garden soil tends to be somewhat heavy and without mechanical tilling or aeration by earthworms or other insects, it begins to compact after several waterings. This can lead to water channeling and dry spots in the soil. This compaction is especially hard on the tender roots of young seedlings just getting established.

More recently, soilless media have been employed as an alternative to soil for growing plants, particularly in the ornamental and vegetable markets. Soilless media are free of disease and other contaminates, and can be custom blended to impart improved drainage, water retention and air space. Soilless mixes are predominantly comprised of a substrate of peat or bark, although other materials, such as coir, have also been employed as the primary medium. Sphagnum peat is lightweight, inexpensive and provides good water drainage yet is water retentive. Coir is a coconut fiber by-product and works similarly to peat in providing good drainage while also retaining water.

In order to improve the performance of soilless media, it has become customary to add blend in materials to the substrate in order to further improve its performance. Among the materials which are conventionally added is perlite, an amorphous volcanic glass that has a relatively high water content, typically formed by the hydration of obsidian. When perlite is used as an additive it has high permeability/low water retention and helps prevent soil compaction. While perlite is comprised of a number of metal oxides, when such material is added to a soilless substrate such as peat, it does not provide growth benefits to plant propagants raised in such mixtures. In this regard, it is noted that U.S. Pat. No. 6,074,988 (King et al) discloses that the use of a composition comprising 75% peat and 25% perlite does not provide enhanced growth in plants absent the addition of a further soluble silica source.

One material which bears a similar chemical structure to perlite is green tuff, a rock produced from the volcanic ash of submarine volcanoes. Green tuff is currently mined in Kuroko region of Japan and was formed during the Miocene period 10 million years ago. It is referred to as green tuff due to its unique greenish gray color. Green tuff is primarily used as a flooring stone in bath and shower areas due to smooth but non-slip surface when wet. In granular form it has also been used as a soil additive being spread on rice or vegetable fields.

As is shown in the Table A below, the composition of a representative sample of green tuff has a metal oxide composition which is very similar to that of perlite In Table A, all components are in percent by weight.

| Component | Perlite | Green Tuff |
|---|---|---|
| $SiO_2$ | 70-75% | 71.4% |
| $Al_2O_3$ | 12-15% | 13.1% |
| $Na_2O$ | 3-4% | 3.5% |
| $K_2O$ | 3-5% | 2.6% |
| $Fe_2O_3$ | 0.5-2% | 3.6% |
| MgO | 0.2-0.7% | 1.2% |
| CaO | 0.5-1.5% | 1.2% |
| $P_2O_5$ | — | 0.1% |

Accordingly, it is completely unexpected that the addition of green tuff to a soilless media substrate will greatly improve the growth of plant propagative material planted in such soilless media.

SUMMARY OF THE INVENTION

In one aspect, the present invention is directed to a soilless media composition comprising (a) green tuff; and (b) a substrate.

In another aspect, the present invention is directed to a method of enhancing the growth of plants comprising adding plant propagative material to a soilless media composition, the soilless media composition comprising (a) green tuff; and (b) a substrate.

DETAILED DESCRIPTION OF THE INVENTION

In one aspect, the present invention is directed to a soilless media composition comprising (a) green tuff; and (b) a substrate.

As is employed herein, the term "green tuff" refers to the greenish gray volcanic material which is mined in Kuroko region of Japan. Such material is pulverized or otherwise reduced in size so that it possesses an average particle size of less than about 10 mm; preferably such material possesses an average particle size of from about 0.1 to about 5 mm. Such particle size can be measured by means well known to one of ordinary skill in the art such as by the use of appropriate size screens, and collecting the material which is either fine enough to pass through a given screens or is too coarse to pass through a given screen, depending upon whether a minimum or maximum particle size is desired.

The term "substrate" refers to any substrate which is conventionally employed as the carrier for a soilless media. Suitable materials used for substances include peats, barks, coir and mixtures thereof, including but not limited to sphagnum peat moss, hypnum peat, reed sedge peat, combusted bark, composted bark and fresh bark. A particularly preferred substrate is sphagnum peat moss.

The green tuff is typically added to the substrate in amounts ranging from about 1 to about 35,000 grams per cubic meter of substrate. Preferably, the green tuff is added in an amount ranging from about 35 to about 3500 grams per cubic meter, more preferably of from 175 to 1500 grams per cubic meter.

The soilless media compositions of this invention can further comprise additional additives conventionally employed in known soilless media compositions.

It has been found that when a peat is employed as the substrate, the soilless media tends to be acidic. Lime or similar material can be added to the soilless media compositions make the media more basic which can be advantageous as additives for the optimal growth of certain plant propagative materials.

Materials such as perlite, vermiculite and the like may be added to the soilless media compositions to improve the water holding capacity and or drainage of the media.

While some types of plant propagative materials do not require fertilizer for germination, it can be advantageous to provide supplemental nutrition for further growth. NPK fertilizers comprising nitrogen, phosphorous and potassium or similar fertilizers can be added to the soilless media.

The additives can comprise up to 25% by weight of the soilless media, although higher or lower percentages may be employed.

The soilless media compositions of the present invention can be prepared by mixing the green tuff, substrate and optionally the additives ( ) employing equipment and processes well known to those of ordinary skill in the art. The mixing can be accomplished sequentially. For example, by first blending the substrate with a fertilizer and perlite; then subsequently adding the green tuff and blending in a separate mixing step. Alternatively, all of the components can be mixed at once. The mixing is conducted until a substantially uniform mixture of the components is obtained.

In another aspect, the present invention is directed to a method of enhancing the growth of plants comprising adding plant propagative material to a soilless media composition comprising (a) green tuff; and (b) a substrate.

As is employed herein the term "plant propagative material" means plants or plant parts capable of growing in a soilless media including seeds and vegetative structures. For example plant propagative material can include leaves, stems and tubers. The plant propagative material is typically a horticultural or vegetable plant species, although it can comprise any plant which is suitably grown in soilless media.

In the practice of the method of the present invention, plant propagative material is added to a soilless media composition comprising (a) green tuff; and (b) a substrate; and is then grown employing conventional techniques well known to one of ordinary skill in the art.

EXAMPLES

The following examples are provided to illustrate the invention in accordance with the principles of this invention, but are not to be construed as limiting the invention in any way except as indicated in the appended claims.

Example 1

Impact of the Addition of Green-Tuff to Potting Media on the Growth of Lettuce Varieties Green-tuff was added to Scotts Miracle grow potting media. Scotts Miracle grow potting mix consists of sphagnum peat, wood bark, perlite and composted wood. The growing media has a 3 month fertilizer charge added at manufacturing. Lettuce seeds were planted into the treated media and untreated potting media and the growth of the lettuce plants was monitored for several weeks. It was observed that all three varieties of lettuce grown in the Green tuff treated media grew faster and were greener.

A bag of Scotts Miracle grow potting media was opened and the contents thoroughly mixed by hand. The media was then divided into 2 equal piles. To one pile, Green tuff (1-5 mm diameter) was added at a rate of 353 grams per cubic meter (1000 g/hectare) and thoroughly mixed by hand into the media. The media was then added to two "earth box" garden boxes and watered in. Three varieties of lettuce seed Bib, Mesclun Mix and Salad bowl were then planted in individual rows in each garden box. No additional fertilizer was added. After 14 days and 28 days the lettuce plants were thinned and the length of each plant measured. At 45 Days the plants were harvested and the average length measured.

| | 14 DAP (Length mm) | | | 28 DAP (Length mm) | | | 45 DAP (length mm) | | |
|---|---|---|---|---|---|---|---|---|---|
| Variety | Untreated | Green-Tuff | % increase | Untreated | Green-Tuff | % increase | Untreated | Green tuff | % Increase |
| Bib | 56.5 | 99 | 75 | 102.5 | 151.1 | 47 | 169.5 | 227.8 | 34 |
| Mesclun | 62.3 | 120.5 | 93 | 104.9 | 180 | 72 | 190.5 | 222.2 | 17 |
| Salad Bowl | 56.0 | 112.2 | 100 | 89 | 144 | 62 | 177.8 | 234 | 31 |

The results show that the addition of Green-tuff to the growing media resulted in faster growing lettuce plants that were larger at harvest. It was observed that the plants grown in the green-tuff treated media were also greener than those grown in the untreated media.

Example 2

The Impact of the Addition of Green-Tuff to Scotts Potting Media on Flowering of Snap Dragon Transplants Green-tuff was added to Scotts miracle grow potting media. The growing media has a 3 month fertilizer charge added at manufacturing. Three Varieties of Snapdragon were planted into the treated media and untreated potting media and the flowering of the Snapdragon plants was monitored at 28 days after transplant. It was observed that all three varieties of Snapdragon grown in the Green tuff treated media had more flowers and were greener.

A 1 cu ft bag of Scotts Miracle grow potting media was opened and the contents thoroughly mixed by hand. The media was then divided into 2 equal piles. To one pile, Green tuff (1-5 mm diameter) was added at a rate of 353 grams per cubic foot (1000 g/hectare) and thoroughly mixed by hand into the media. The media was then added to two garden pots and watered in. Three varieties of snapdragon plants were transplanted into the pots. None of the plants were blooming prior to transplant and were all 45 days old after seeding. No additional fertilizer was added. After 28 days the number of flowers on each plant were counted.

| 28 DATP (Number Flowers) | | | |
|---|---|---|---|
| Variety | Untreated | Green-Tuff | % increase |
| Yellow | 2 | 17 | 850 |
| Burgundy | 13 | 49 | 377 |
| Pink | 28 | 97 | 345 |

The results show that the addition of Green-tuff to the growing media resulted in faster blooming of the snapdragon plants. Plants grown in the treated media were also greener than those grown in the untreated media.

Example 3

The Impact of the Addition of Green-Tuff at Different Rates to Scotts Potting Media on the Growth of Vegetable and Flower Seeds Green-tuff was added to Scotts Miracle grow potting media. The growing media has a 3 month fertilizer charge added at manufacturing. Three Varieties of plant seed, marigold, radish and tomato were planted into the treated media, at different rates of Green-tuff and untreated potting media and the germination and growth of the plants were monitored.

A 2 cu ft bag of Scotts Miracle grow potting media was opened and the contents thoroughly mixed by hand. The media was then divided into five equal piles. To four piles, Green tuff (1-5 mm diameter) was added at a rate of 176.5, 353, 706 and 1412 grams/cubic meter (5, 10, 20 and 40 grams per cubic foot) and thoroughly mixed by hand into the media. The other pile had no Green-tuff added. Four each treatment, four replications were used and five seeds sown per replication in 4 inch pots for a total of 12 pots per treatment. The seeds were allowed to grow for 2 weeks, then the number of seeds that had germinated were recorded and each pot was thinned down to one plant. These plants were the grown for another two weeks and then harvested and dried to record the dry weight.

| | Number Germinated Seeds 14 DAP | | | | |
|---|---|---|---|---|---|
| Variety | Untreated | 176.5 g/cu m | 353 g/cu m | 706 g/cu m | 1412 g/cu m |
| Radish | 100 | 100 | 95 | 100 | 100 |
| Marigold | 50 | 45 | 35 | 50 | 50 |
| Tomato | 95 | 100 | 100 | 95 | 85 |

| | Dry weight of Plants 28 DAP | | | | |
|---|---|---|---|---|---|
| Variety | Untreated | 176.5 g/cu m | 353 g/cu m | 706 g/cu m | 1412 g/cu m |
| Marigold | 0.09 | 0.23 | 0.21 | 0.18 | 0.04 |
| Radish | 0.08 | 0.31 | 0.23 | 0.25 | 0.16 |
| Tomato | 0.02 | 0.17 | 0.12 | 0.12 | 0.07 |

The results show that the addition of Green-tuff at a rate of 176.5-1412 g/m to the growing media did not impact the germination of any of the seeds but it did increase the growth of the seedling at all rates tested.

Example 4

The Impact of the Addition of Green-Tuff at Different Rates to Scotts Potting Media on Marigolds and Zinnias Green-tuff was added to Scotts miracle grow potting media. The growing media has a 3 month fertilizer charge added at manufacturing. Two varieties of flower transplant, marigold and Zinnia were trans-planted into the treated media, at different rates of Green-tuff and untreated potting media and the germination and growth of the plants were monitored.

Two 2 cu ft bag of Scotts Miracle grow potting media was opened and the contents thoroughly mixed by hand. The media was then divided into five equal piles. To four piles, Green tuff (1-5 mm diameter) was added at a rate of 176.5, 353, 706 and 1412 grams/cubic meter (5, 10, 20 and 40 grams per cubic foot) and thoroughly mixed by hand into the media. The other pile had no Green-tuff added. For each treatment, seven replications were used in 3 gallon pots for a total of seven pots per treatment. The transplants were watered daily and allowed to grow for 10 weeks and the dry weight of the plants was measured.

| | AVG Dry weight of Plants (grams) 10 weeks after transplant | | | | |
|---|---|---|---|---|---|
| Variety | Untreated | 176.5 g/cu m | 353 g/cu m | 706 g/cu m | 1412 g/cu m |
| Marigold | 10.44 | 8.57 | 13.76 | 23.5 | 23.74 |
| Zinnia | 19.98 | 27.51 | 27.78 | 22.5 | 28.9 |

| | % increase in AVG dry weight over untreated control | | | |
|---|---|---|---|---|
| Variety | 176.5 g/cu m | 353 g/cu m | 706 g/cu m | 1412 g/cu m |
| Marigold | −17.9 | 31.8 | 125 | 127.3 |
| Zinnia | 38 | 39 | 13 | 45 |

The results show that the addition of Green-tuff at a rate of 176.5-1412 g/cu m to the growing media tested increased plant growth of both Marigold and Zinnia. At a rate of 176.5 g/cu m the addition of green-tuff increased the growth of Zinnia but not Marigold. It was observed that at this low rate of addition it was difficult to uniformly mix the green tuff into the potting media. As a result there was great variability in the growth of the plants and there dry weights ranged from 3.6 to 32.7 grams/plant.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A soilless media composition comprising (a) green tuff; and (b) a substrate, wherein the green tuff comprises components of $SiO_2$, $Al_2O_3$, $Na_2O$, $Fe_2O_3$, $K_2O$, $CaO$, $MgO$, and $P_2O_5$ and the substrate comprises one or more materials selected from coir and bark.

2. The soilless media composition of claim 1 wherein the $SiO_2$ is 71.4% percent by weight, the $Al_2O_3$ is 13.1% percent by weight, the $Na_2O$ is 3.5% percent by weight, the $Fe_2O_3$ is 3.6% percent by weight, the $K_2O$ is 2.6% percent by weight, the CaO is 1.2% percent by weight, the MgO is 1.2% percent by weight, and the $P_2O_5$ is 0.5% percent by weight and the bark is selected from the group consisting of combusted bark, composted bark and fresh bark.

3. The soilless media composition of claim 1 wherein the green tuff is present in an amount of from about 1 to about 35,000 grams per cubic meter of substrate.

4. The soilless media composition of claim 3 wherein the green tuff is present in an amount of from about 35 to about 3,500 grams per cubic meter of substrate.

5. The soilless media composition of claim 4 wherein the green tuff is present in an amount of from about 175 to about 1500 grams per cubic meter of substrate.

6. The soilless media composition of claim 5 further comprising lime.

7. The soilless media composition of claim 6 further comprising a fertilizer.

8. The soilless media composition of claim 7 further comprising water-holding or drainage additive.

9. The soilless media composition of claim 8 wherein the water holding drainage additive is perlite or vermiculite.

10. A method of enhancing the growth of plants comprising adding plant propagative material to the soilless media composition of claim 1.

11. The method of claim 10 wherein said plant propagative material is a seed.

12. The method of claim 10 wherein said plant propagative material is a horticultural or vegetable plant.

* * * * *